April 13, 1937.　　　R. F. NEWTON　　　2,076,914

INTERURBAN AND SUBWAY TRANSPORTATION SYSTEM

Filed June 28, 1935　　　2 Sheets-Sheet 1

INVENTOR
Ray F. Newton
BY G. F. McDougall
ATTORNEY

April 13, 1937.  R. F. NEWTON  2,076,914
INTERURBAN AND SUBWAY TRANSPORTATION SYSTEM
Filed June 28, 1935  2 Sheets-Sheet 2
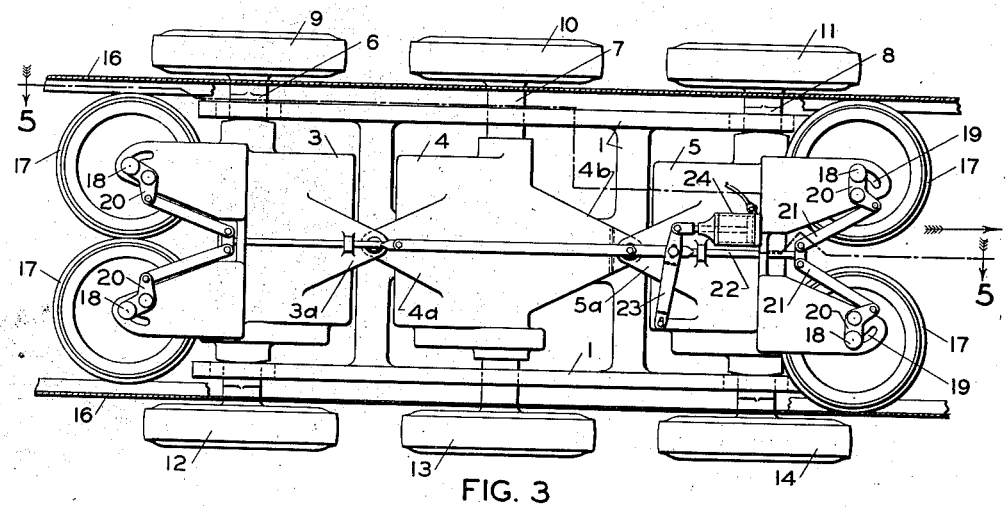
FIG. 3
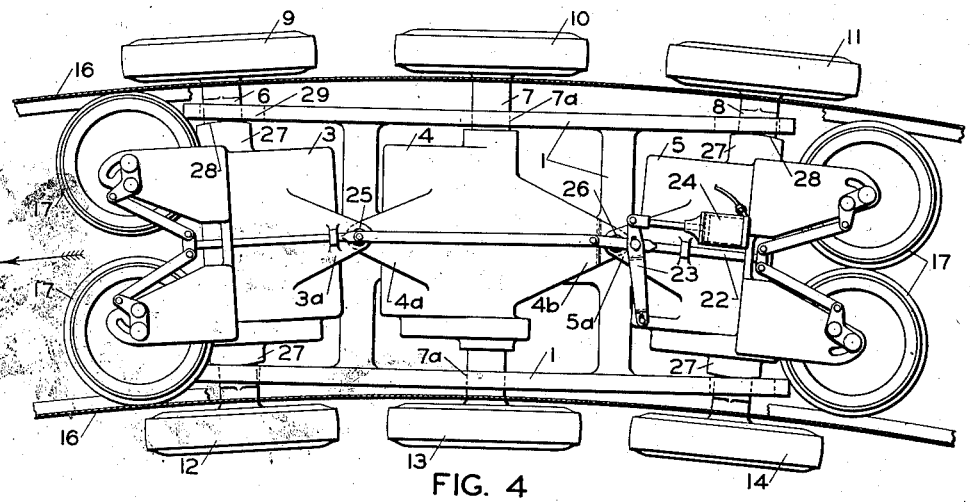
FIG. 4
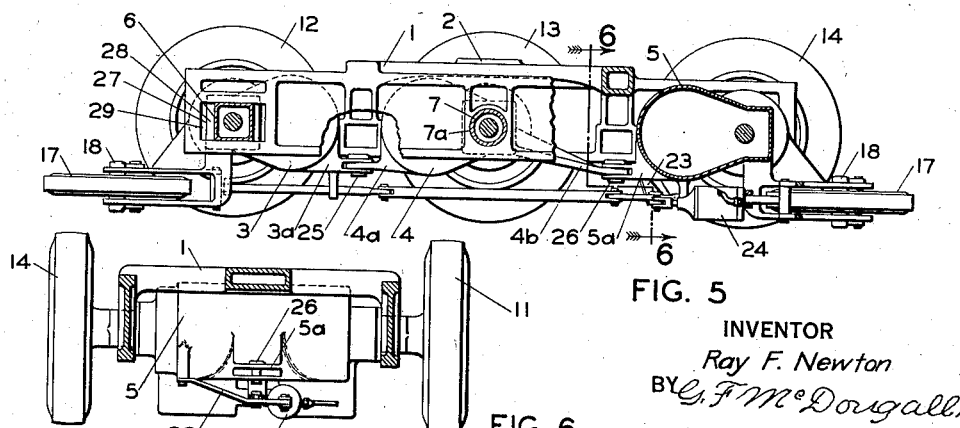
FIG. 5
FIG. 6
INVENTOR
Ray F. Newton
BY G. F. McDougall
ATTORNEY Patented Apr. 13, 1937

2,076,914

UNITED STATES PATENT OFFICE 2,076,914

INTERURBAN AND SUBWAY TRANSPORTATION SYSTEM

Ray F. Newton, San Francisco, Calif.

Application June 28, 1935, Serial No. 28,860

16 Claims. (Cl. 105—215)

My invention herein relates to high speed transportation systems including a track and self-propelled vehicles of the coach type, either singly or in trains, and has for its principal object as delineated and described in this portion thereof, a truck which makes available the use of pneumatic tires on vehicles of this character that are adapted to run on steel rails.

An object of this invention subsidiary to the one above mentioned is a truck of the character described that is adapted to run upon and be guided by steel rails in which the side walls of the pneumatic tires are kept out of contact with the rails at all times.

Another object of the invention is a self-guided truck of the character described in which the guiding is done by horizontal wheels which may be tired with either pneumatic tires or hard rubber and in which the guide wheels are kept in physical contact with the rail member by a resilient force of sufficient magnitude to substantially exceed any possibility of side sway moment in going around curves.

Another object of my invention is an articulated truck of the character described, in which a pair of guide wheels is placed at each end of the truck in such a manner that a horizontal line drawn through the axes of the guide wheels will lie in a plane substantially ahead of the axes of the leading wheels of the truck that turning moment may be applied effectively to the leading pair of wheels.

Numerous other objects will be apparent to those skilled in the art to which this invention appertains or is most nearly connected, and which are set forth in the subjoined claims.

Drawings are used to show a preferred form of the invention and are partly diagrammatic. In the drawings,—

Fig. 3 is a bottom view of the truck indicated in Fig. 1 as it will appear on a straight track and assumed to be proceeding in the direction shown by the arrow in this view: Sec. 3—3 Fig. 2;

Fig. 4 is a view of the same structure shown in Fig. 3 proceeding in the opposite direction to that indicated by Fig. 3 and as indicated by the arrow in this view, on a curved portion of the track;

Fig. 5 is a section on the line 5—5 of Fig. 3; and

Fig. 6 is a section on the line 6—6 of Fig. 5.

Figure 1:
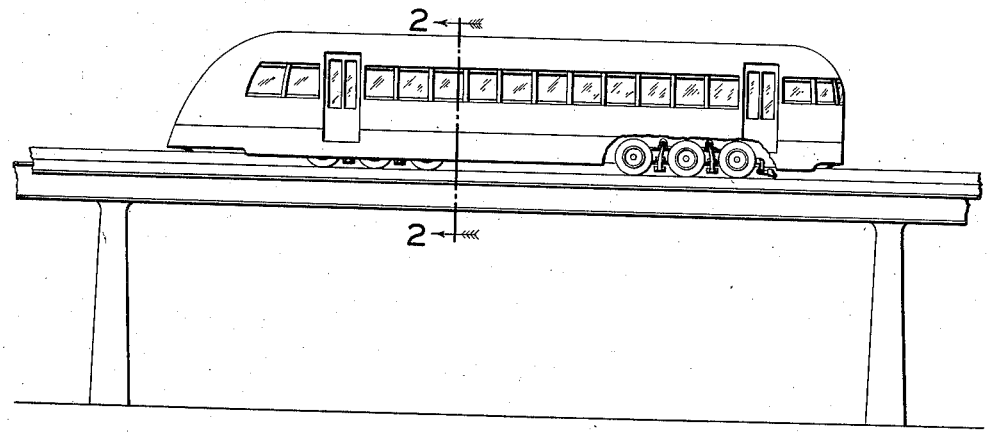
Fig. 1 represents a single coach supported on two of my articulated trucks and has part of the side of the coach broken away to show an end view of one truck.

As will be noted from the views, the truck is a three unit articulated truck having a frame 1, supporting a center plate 2, upon which part of the weight of the body of the coach will rest. The center plate 2, will be provided with the usual center pin and suitable bearings for carrying the weight as specified.

Motor housings 3 and 4 and 5, diagrammatically represent means of applying power to the axles 6, 7 and 8, thence to the load wheels 9, 10, 11, 12, 13 and 14, which are shown to be equipped with pneumatic tires, not given a specific numerical designation.

The motor housings 3, 4 and 5 diagrammatically represent any means of applying power to the axles, the wheels and tractive power to the track. Articulation arms 3a, 4a, 4b and 5a are shown as made integral with the motor housings 3, 4 and 5.

Figure 2:
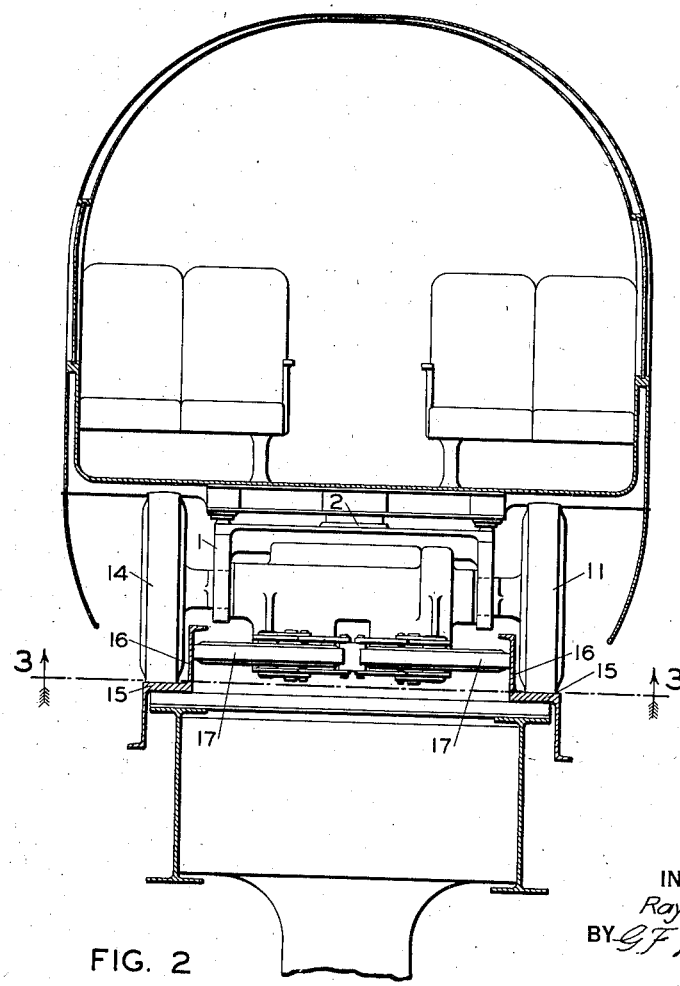
Fig. 2 is a section on the line 2—2 of Fig. 1 and shows a front view of the guide wheels and a preferred form of steel rail.

A preferred form of track is shown in Fig. 2 in which 15 represents the tread upon which the wheels such as 11 and 14 will roll, and in which 16 is an integral upstanding flange against which the guide wheels 17 are adapted to bear in the manner specifically hereinafter pointed out in detail.

The guide wheels 17 are rotatively mounted upon the pivots 18 without power being applied thereto. The pivots 18 are movable in the arcuate slots 19 under the influence of the bell cranks 20, the reach rods 21, the main rod 22, and the lever 23, by means of power applied by the air motor 24. All of these several connections to the guide wheel 17 are diagrammatic as is also the air motor 24, which may be single or double action and which may control both sets of guide wheels as shown in Fig. 3, or if preferred a separate control means may be applied at each end of the truck to independently control the guide wheels at that end.

An important feature of this invention is the one of articulating the three units of the truck by the articulation joints 25 and 26 which are shown equi-distant between the axes of the axles 6 and 7, on one end of the truck and between the axes of the axles 7 and 8 on the other end of the truck.

The articulation joints 25 and 26 will be anti-friction bearings. At each end of the motor housings 3 and 5, are found shoulders which have been given the same numeral, 27, in all cases. These shoulders have arcuate bearing surfaces 28, and are in frictional contact with adjacent portions of the frame 1.

Slots 29, are placed in the frame 1, for a relative movement of the axle such as 6 as shown in the upper left hand corner of Fig. 4, when going around a curve. This of course necessitates that the center axle of the group such as 7 (as illustrated in Fig. 4) and its motor housing be movable with respect to the frame 1. As the articulated truck goes around a curve, the movement of the leading axle 6, carries the frame 1, with it.

The angular movement of the articulation arm moves the articulation arm 4a to maintain the housing 4 in its normal position with respect to the track and the bearings 7a, restrain it from any angular movement with respect to the frame 1, holding the frame and the center axle always parallel with the track on tangents and always parallel with a tangent to a curve from the point directly under the axis of the center axle 7.

By this construction the side-walls of tires on the load wheels 10 and 13, are never brought in contact with the flange 16, on a curve and the rear or trailing axle such as 8, receives its proper angularity with respect to the track by influence applied by articulation arm 4b, applied to articulation arm 5a. It will be seen that all of the articulation arms must be of the same length, measured from the axis of the axle from which they project. It is also seen that the trailing pair of wheels thus do not need guide wheels in contact with the track to prevent their contact with the flange 16.

Various modifications of the schematic illustrations described are easily possible without departing from the principles disclosed and mechanical equivalents may be substituted for structures now deemed the best known way of carrying out and practicing my invention, therefore I do not limit myself as to my invention except by the following claims. I claim:

1. A truck member for a vehicle adapted to run on a track, comprising a frame, triple articulated axle carrying means upon which the frame is mounted, triple axles in said means, load wheels mounted on said axles, and pairs of leading horizontal guide wheels incorporated with said articulated means and said frame that are alternatively effective to maintain the frame in parallel relationship to a track on tangents, independently of said load wheels.

2. A truck member for a vehicle adapted to operate on a railway, comprising a load carrying frame, triple articulated axle carrying means supporting said frame, triple axles in said axle carrying means, load wheels mounted on said axles and pairs of leading horizontal guide wheels incorporated with said frame and said articulated axle carrying means that are selectively effective to bear against a track to maintain said frame in parallel relationship to the tangent of a curved portion of railway.

3. An articulated three-unit truck for a rail vehicle comprising a frame, three spaced axle housings upon which said frame is mounted, median articulation means joining the axle housings, wheeled axles mounted in said housings and a pair of guide wheels horizontally supported to bear against a supporting rail at a point substantially in advance of the point of contact of the end pair of wheels of the truck unit.

4. The combination as characterized in claim 3 and including resilient power means for forcibly maintaining the guide wheels against the track surfaces.

5. The combination as characterized in claim 3 and including manipulative means for moving the guide wheels into and out of forcible contact with rail surfaces.

6. In an articulated truck for track use, three axle units for said truck, load wheels for each axle, axles for each unit that are spaced equidistantly, pivoted articulation means connecting the axle units that are spaced to operate midway between the axles and two pairs of horizontal guide wheels, each pair connected to an end axle housing, and spaced beyond each leading axle, said guide wheels being arranged to alternatively contact with a rail surface to guide the leading axle units with respect to a track.

7. The combination as characterized in claim 6 and including means for selectively spreading the guide wheels apart into forcible contact with a track to wholly assume the guiding function.

8. An articulated three axle truck for a rail vehicle including means adapting said truck for pneumatic tired load wheels which consists essentially of a pair of leading horizontal guide wheels at each end of said truck that are arranged to be alternatively brought to bear against opposite rails of a track at a point substantially in advance of the leading axle.

9. The combination as characterized in claim 8 and including selectively operative means for withdrawing the trailing pair of guide wheels to a point close to but out of actual contact with a track.

10. The combination as characterized in claim 8 and including resilient means for applying heavy pressure to the leading pair of guide wheels to resist horizontal moments transverse to the track.

11. An articulated three axle truck comprising a load carrying frame, triple articulated means for supporting three axles in load carrying relationship to said frame, said triple articulated means being the full effective width of the inside of the frame at each end in abutting relationship thereto and the end elements being movable angularly with respect to the axis of said frame, with a center axle supporting articulated means that is less than the effective inside width of the frame and movable transverse thereto under the influence of angular movement of said other articulated means.

12. Means for maintaining a truck frame parallel to a track or to the tangent of the curve of a track, comprising a frame, triple articulated axle carrying means arranged to support said frame, end elements of said axle carrying means in abutting relationship and angularly movable with respect to the frame and a center articulated axle carrying means arranged for transverse movement with respect to the longitudinal axis of the frame under the influence of angular movement of said end elements.

13. An articulated triple axle truck for a rail vehicle including means adapting said truck for pneumatic tired load wheels which consists essentially of a pair of horizontal guide wheels at each end of said truck that are alternatively adapted to bear against opposite rails of a track at a point substantially in advance of the leading axle.

14. In an articulated truck for track use, plural axle units for said truck, load wheels for each axle, axles for each unit that are spaced equi-distantly, pivoted articulation means spaced to operate in the space midway between the axles and a pair of horizontal guide wheels spaced beyond each end axle that are arranged to alternatively contact with a rail surface to guide the leading unit with respect to a track.

15. Means for guiding a truck on a railway, independently of end thrust on the load wheels thereof comprising a truck frame, triple articulated axle carrying means supporting said frame, axles in the axle carrying means, load wheels on the axles that are arranged to carry vertical loads, guide wheel supporting means attached to each of the end axle carrying means that are arranged to carry a pair of guide wheels spaced beyond each end of said truck frame, guide wheels on said supporting means and means for alternatively moving a pair of said guide wheels into contact with a track and simultaneously withdrawing the other pair from track contact.

16. In an articulated truck unit for a rail vehicle, a load frame, triple truck units arranged to support the frame above a track, articulation connections between the several trucks, a two wheeled load carrying axle mounted in each truck, end axles being pivotally mounted with respect to the load frame and a center axle being movable in a plane normal to the axis of said frame and guide wheels of the character described spaced to lead either end of the articulated truck unit that are arranged for alternate track contact to guide the leading truck.

RAY F. NEWTON.